Patented Feb. 3, 1925.

1,525,078

UNITED STATES PATENT OFFICE.

WALTER KROPP, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

MERCURY DERIVATIVES OF HYDROXYBENZOIC ACIDS.

No Drawing. Application filed March 7, 1924. Serial No. 697,674.

*To all whom it may concern:*

Be it known that I, WALTER KROPP, a citizen of Germany, residing at Elberfeld, in the State of Prussia, Germany, have invented new and useful Improvements in Mercury Derivatives of Hydroxybenzoic Acids, of which the following is a specification.

My invention relates to the preparation of the hitherto unknown mercury compounds of substituted hydroxy acids of the benzene series, e. g. of para-benzylhydroxybenzoic acid, having the following general formula:

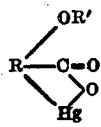

R stands for an aromatic radicle, such as phenyl, tolyl; R' stands for an aryl and aralkyl.

The new products can be obtained by treating the said substituted hydroxybenzoic acids with mercuric oxide or salts of mercury.

The new products are whitish compounds which are generally soluble with difficulty in water, alcohol and ether, soluble in dilute solutions of sodium carbonate, insoluble in dilute mineral acids, e. g. the acid of the stomach. Owing to these properties they go unaltered through the stomach and show their therapeutic action only in the intestines. They have proved to be valuable antisyphilitics characterized by a mild action and the fact that they are non-irritant and not corrosive renders them highly valuable for internal application. They can be taken per os.

In order to illustrate my new process more fully the following example is given:—

114 parts by weight of para-benzylhydroxybenzoic acid having most probably the following formula:

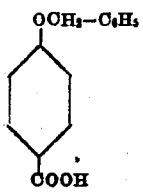

are triturated together with 155 parts by weight of acetate of mercury and the mixture is heated in an oilbath to 140–150° C. until a test portion is soluble in dilute caustic soda lye. Subsequently the melt is treated with hot alcohol and the precipitate is dissolved in dilute caustic soda solution and the resulting solution is filtered. The hydroxy-mercuri-para-benzyl-hydroxybenzoic acid anhydride is precipitated from the alkaline solution by means of $CO_2$. It is a whitish powder which decomposes on heating. It is soluble with difficulty in water, alcohol and ether. It contains about 47 per cent of mercury. It most probably has the formula

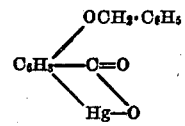

Other substituted monoaryl- or monoaralkyl-hydroxybenzoic acids may be used e. g. ortho-benzyl-hydroxybenzoic acid:

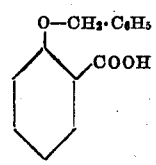

or ortho-phenyl-hydroxybenzoic acid:

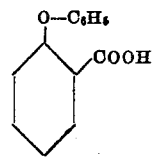

etc.

I claim:—

1. The herein described new products being mercury substituted derivatives of hydroxybenzoic acids wherein the hydrogen of the hydroxy group is substituted by a radicle containing an aryl or aralkyl, which products are after being dried and pulverized whitish compounds generally soluble with difficulty in water, alcohol and ether, being soluble in dilute solutions of sodium carbonate, insoluble in dilute mineral acids, and being valuable antisyphilitics which can be taken "per os", substantially as described.

2. The herein described new hydroxymercuri-para-benzyl-hydroxybenzoic acid anhydride being a whitish powder having most probably the formula:
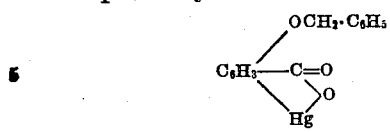
which decomposes on heating, being soluble with difficulty in water, alcohol and ether, containing about 47 per cent mercury and being a valuable antisyphilitic which can be taken " per os ", substantially as described.
In testimony whereof I have hereunto set my hand.
WALTER KROPP.